Dec. 23, 1930.  E. L. HOUGH  1,786,303
AUTOMATIC CONTROL EQUIPMENT
Filed March 2, 1929
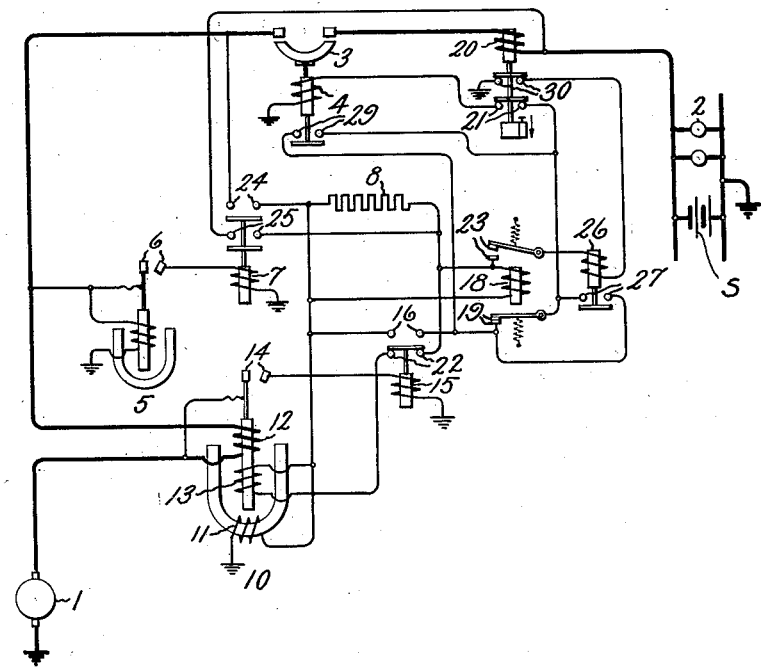
Inventor:
Eugene L. Hough,
by Charles E. Tullar
His Attorney.

Patented Dec. 23, 1930

1,786,303

UNITED STATES PATENT OFFICE

EUGENE L. HOUGH, OF RICHMOND HEIGHTS, MISSOURI, ASSIGNOR TO GENERAL ELECTRIC COMPANY, A CORPORATION OF NEW YORK

AUTOMATIC CONTROL EQUIPMENT

Application filed March 2, 1929. Serial No. 344,046.

My invention relates to automatic control equipments and particularly to an arrangement for controlling the connection between a source of current and a load circuit and its object is to provide an improved arrangement for effecting the connection of a source to a load circuit when the source voltage is higher than the load circuit voltage and an abnormal condition does not exist on the load circuit and for effecting the disconnection of the source in response to a reversal of current between the load circuit and the source.

My invention will be better understood from the following description when taken in connection with the accompanying drawing which shows diagrammatically a control arrangement embodying my invention and its scope will be pointed out in the appended claims.

Referring to the drawing, 1 represents a source of current which is arranged to be connected to a load circuit 2 by means of suitable switching means such as a contactor 3 having a closing coil 4.

In systems of electric distribution of the type shown in the drawing in which the load circuit 2 is supplied by another source s, it is very essential in many cases that the voltage of the source 1 be above the voltage of the load circuit 2 and also that there is no fault connected to the load circuit when the circuit breaker 3 closes. It is also desirable to open the circuit breaker 3 when reverse current flows from the load circuit 2 to the source 1.

In the arrangement shown, these results are obtained by means of a polarized voltage relay 5 which is connected to a source 1 and which is arranged to close its contacts 6 and complete an energizing circuit for a control relay 7 when the voltage of the source 1 is above a predetermined value and has a predetermined polarity. The control relay 7 when energized is arranged to connect suitable current limiting means such as a resistor 8 across the terminals of the circuit breaker 3 so that only a small current flows from the source 1 to the load circuit 2 in case there is a fault connected across the load circuit.

In order to allow the circuit breaker 3 to close only after the voltage of the source 1 has exceeded the load circuit voltage and to effect the opening of the circuit breaker 3 in response to a current reversal while the circuit breaker 3 is closed, I provide a directional relay 10 having a magnetizing winding 11 and two operating windings 12 and 13. The magnetizing winding 11 is connected across any suitable source of current such as the source 1. The operating windings 12 and 13 are respectively connected in series relation with the source 1 and in shunt to the resistor 8. Since the resistor 8 is connected to the circuit breaker terminals only when the relay 7 is energized the winding 13 of relay 10 is energized only when the generator 1 is in operation and the voltage thereof is above a predetermined value and has a predetermined polarity. The windings 12 and 13 are wound cumulatively on the same magnetic core in such a manner that when the source voltage exceeds the load circuit voltage and current flows through the windings 12 and 13 from the source 1 to the load circuit 2 the relay 10 closes its contacts 14 and completes an energizing circuit for a control relay 15. The control relay 15 controls contacts 16 in the energizing circuit of the closing coil 4 of the circuit breaker 3 so that the relay 15 has to be energized in order to close the circuit breaker 3.

Any suitable automatic reclosing arrangement, examples of which are well known in the art, may be provided to prevent the closing of the circuit breaker 3 after the relay 15 is energized, until the conditions on the load circuit 2 are normal. As shown in the drawing, I have provided the well known reclosing arrangement including a combined selective and reclosing relay 18 which is connected across the resistor 8 and which is arranged to close contacts 19 in the energizing circuit of the closing coil 4 of the circuit breaker 3 when the difference between the source and load circuit voltages is less than a predetermined value and to close contacts 23 when the difference between the source and load circuit voltages is above a predetermined value which is greater than the value required to open contacts 19. The contacts 23 are in an energized circuit of a reclosing relay 26, which is arranged to be connected across the load circuit 2 and which controls contacts 27 in a shunt circuit around contacts 19.

Overcurrent relay 20, which is connected so as to be responsive to the current through the circuit breaker 3 when closed, is provided to control contacts 21 in the energizing circuit of the closing coil 4 so that the opening of the circuit breaker 3 is effected when an abnormal current flows through the circuit breaker. The overcurrent relay 20 also controls contacts 30 in the circuit of the reclosing relay 26 so that this relay cannot operate to effect the reclosing of the circuit breaker until after the circuit breaker has remained open for a predetermined time.

In order that the source 1 may be connected to the load circuit 2 in response to a voltage thereof which exceeds the load circuit voltage only a very small amount, it is necessary to design the relay 10 so that it responds to a very small voltage difference. In order that a relatively inexpensive relay having the desired sensitiveness may be used for this purpose, I provide in accordance with my invention an arrangement for reducing the current through the operating winding 13 of the relay 10 as soon as the voltage of the source 1 exceeds the load circuit voltage sufficiently to cause the relay 10 to close its contacts 14. In the arrangement shown, I accomplish this result by connecting the contacts 22 of the relay 15 in series with the winding 13 so that the circuit of the winding 13 is opened when the control relay 15 is energized. In some cases, however, it may be desirable to increase the impedance of the circuit of winding 13 by inserting a finite resistance instead of an infinite resistance in the circuit of the winding 13, when the relay 15 is energized.

It will be observed that with my improved arrangement, an operating winding 13 having a very short time rating may be used in a relay having the desired sensitiveness, since the winding 13 has a relatively large current flowing through it for only a very short time and, therefore, does not have to be designed to withstand substantially normal voltage which it would have to do if it remained permanently connected directly across the resistor 8, as substantially normal voltage exists across the resistor 8 when the relay 7 is energized and there is a severe fault connected across the load circuit.

The operation of the arrangement shown in the drawing is as follows: When it is desired to connect the source 1 to the load circuit 2, the source 1 is started in any suitable manner and as soon as the voltage of the source is above a predetermined value and has a predetermined polarity, the relay 5 closes its contacts 6 and connects the control relay 7 across the source 1. The control relay 7 by closing its contacts 24 and 25 connects the resistor 8, the winding 13 of relay 10 and the winding of relay 18, which are connected in parallel, in series between the source 1 and the load circuit 2. The energization of the control relay 7 also connects the magnetizing winding 11 of the directional relay 10 across the source 1. As soon as the source voltage exceeds the load circuit voltage, current flows from the source 1 through the operating windings 12 and 13 of the relay 10 to the load circuit 2 so that the relay 10 closes its contacts 14 and connects the control relay 15 across the source 1. Control relay 15 when energized opens its contacts 22 and disconnects the operating winding 13 of relay 10 from in shunt to the resistor 8 so that the winding 13 is rendered unresponsive to the voltage drop across the resistor 8.

If the load circuit 2 is energized by some other source when the relay 7 is energized the voltage impressed across winding of relay 18 is not sufficient to cause the relay 18 to close its contacts 23, but it does cause the relay 18 to open its contacts 19 if there is a fault on the load circuit.

As soon as the fault is removed and the voltage difference between the source 1 and the load circuit 2 is less than a predetermined amount, relay 18 closes its contacts 19 and completes an energizing circuit for the closing coil 4. This circuit is from the ungrounded side of the source 1 through the operating winding 12 of the relay 10, contacts 24 of relay 7, contacts 16 of relay 15, contacts 19 of relay 18, contacts 21 of relay 20, closing coil 4 to ground. The circuit breaker 3, when closed, short-circuits the resistor 8 and connects the source 1 directly to the load circuit 2 with the coil of the overcurrent relay 20 in series.

The circuit breaker 3, by closing its auxiliary contacts 29, completes a locking circuit for its closing coil 4.

If the load circuit 2 is not energized by another source when the relay 7 is energized and there is a fault on the load circuit 2, the voltage impressed on the coil of relay 18 when the relay 7 is energized, is sufficient to open contacts 19 and close contacts 23 so that the coil of relay 26 and the contacts 30 of the overcurrent relay 20 are connected in series across the load circuit. As soon as the load resistance is above a predetermined value, relay 26 closes its contacts 27 and effects the closing of the circuit breaker 3.

When an overload occurs on the load circuit 2 the overcurrent relay 20 opens its contacts 21 and deenergizes the closing coil 4 so that the circuit breaker 3 opens the short-circuit around the resistor 8. Preferably, the overload relay 20 is designed so that it does not reclose its contacts 21 and 30 until after it has been deenergized for a predetermined length of time so that the circuit breaker 3 cannot be reclosed immediately after it is opened. As soon as the fault across the load circuit 2 is removed either the relay 18 or the relay 26 operates, depending upon the condition of the load circuit, to effect the closing of the circuit breaker 3.

In case of a reversal of current through the circuit breaker 3, the relay 10 opens its contacts 14 and deenergizes the relay 15 which, in turn, opens its contacts 16 and deenergizes the closing coil 4 so that the circuit breaker 3 opens and disconnects the source 1 from the load circuit. As soon as the source voltage again exceeds the load circuit voltage, the directional relay 10 closes its contacts 14 and the closing of the circuit breaker 3 is effected in the manner above described.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a source of current, a load circuit, a circuit breaker for connecting said source to said circuit, a directional relay for controlling said circuit breaker including a magnetizing winding responsive to the voltage of said source and two operating windings one of said operating windings being responsive to the current output of said source and the other of said operating windings being responsive to the voltage difference between said source and load circuit, means controlled by said relay for rendering said last mentioned operating winding unresponsive to said voltage difference when the source voltage exceeds the load circuit voltage, and means responsive to a predetermined electric condition of said load circuit while said last mentioned operating winding is unresponsive to said voltage difference for effecting the closing of said circuit breaker.

2. In combination, a source of current, a load circuit, a circuit breaker for connecting said source to said circuit, a directional relay for controlling said circuit breaker including a magnetizing winding responsive to the voltage of said source, and two operating windings, one of said operating windings being connected in series relation with said source and the other of said operating windings being connected across said circuit breaker terminals, means controlled by said relay for disconnecting said last mentioned operating winding from across said circuit breaker terminals when the source voltage exceeds the load circuit voltage, and means controlled by the load connected to said load circuit for effecting the closing of said circuit breaker after said operating winding has been disconnected from across the circuit breaker terminals.

3. In combination, a source of current, a load circuit, a circuit breaker for connecting said source to said circuit, a directional relay for controlling said circuit breaker including a magnetizing winding responsive to the voltage of said source, and two operating windings, one of said operating windings being connected in series relation with said source whenever it is connected to said load circuit and the other of said operating windings being connected in a shunt circuit around the main contacts of said circuit breaker, a control relay controlled by said directional relay for effecting a decrease in the current through said last mentioned operating winding when the source voltage exceeds the load circuit voltage, closing means for said circuit breaker, a control circuit for said closing means, reclosing means responsive to an electric condition of said load circuit while said circuit breaker is open, and contacts in said control circuit controlled by said control relay and said reclosing means so that said circuit breaker can be reclosed only after the source voltage has exceeded the load circuit voltage and the load is less than a predetermined value.

4. In combination, a source of current, a load circuit, an impedance, means for connecting said impedance in series between said source and load circuit, a circuit breaker for shunting said impedance, a directional relay for controlling the operation of said circuit breaker having two operating windings respectively connected in series with and in shunt to said circuit breaker, means controlled by said relay for increasing the impedance of the circuit of the operating winding connected in shunt to said circuit breaker when current flows through said operating windings from said source to said load circuit, and means controlled by the current supplied through said first mentioned impedance for effecting the closing of said circuit breaker after the impedance of the circuit of said last mentioned operating winding has been increased.

5. In combination, a source of current, a load circuit, an impedance, means for connecting said impedance in series between said source and load circuit, a circuit breaker for shunting said impedance, a directional relay for controlling the operation of said circuit breaker having two operating windings respectively connected in series with and in shunt to said circuit breaker, a control relay arranged when energized to effect the disconnection of said last mentioned operating winding from in shunt to said circuit breaker, means controlled by said directional relay for effecting the energization of said control relay when the source voltage exceeds the load circuit voltage, a closing coil for said circuit breaker, a circuit for said closing coil, contacts in said closing coil circuit controlled by said control relay so that said closing coil circuit is open when current flows from the load circuit to the source, other contacts in said closing coil circuit, and reclosing means responsive to a predetermined electric condition of said load circuit while said circuit breaker is open for controlling said other contacts.

6. In combination, a source of current, a load circuit, a circuit breaker for connecting said source to said circuit, a directional relay for controlling said circuit breaker including two operating windings, one of said operating windings being connected in series relation with said source and the other of said operating windings being connected across said circuit breaker terminals, means controlled by said relay for increasing the impedance of the circuit of said last mentioned operating winding when the source voltage exceeds the load circuit voltage, and means controlled by the load connected to said load circuit for effecting the closing of said circuit breaker after the impedance of the circuit of said last mentioned operating winding has been increased.

In witness whereof, I have hereunto set my hand this 26th day of February 1929.

EUGENE L. HOUGH.